(12) United States Patent
Galitsky et al.

(10) Patent No.: US 9,171,037 B2
(45) Date of Patent: Oct. 27, 2015

(54) SEARCHING FOR ASSOCIATED EVENTS IN LOG DATA

(71) Applicant: TIBCO Software Inc., Palo Alto, CA (US)

(72) Inventors: Boris Galitsky, Palo Alto, CA (US); Sherif Botros, Redwood Shores, CA (US)

(73) Assignee: TIBCO Software Inc., Palo Alto, CA (US)

( * ) Notice: Subject to any disclaimer, the term of this patent is extended or adjusted under 35 U.S.C. 154(b) by 181 days.

(21) Appl. No.: 13/668,847

(22) Filed: Nov. 5, 2012

(65) Prior Publication Data

US 2013/0185286 A1 Jul. 18, 2013

Related U.S. Application Data

(63) Continuation of application No. 11/866,337, filed on Oct. 2, 2007, now Pat. No. 8,306,967.

(51) Int. Cl.
*G06F 17/30* (2006.01)

(52) U.S. Cl.
CPC .... *G06F 17/30424* (2013.01); *G06F 17/30637* (2013.01); *G06F 17/30666* (2013.01)

(58) Field of Classification Search
CPC .............. G06F 17/30; G06F 17/30424; G06F 17/30395; G06F 17/30398; G06F 17/30427; G06F 17/30442; G06F 17/30696; G06F 17/302785; G06F 17/30554
USPC .......................... 707/713, 718, 720, 771, 785
See application file for complete search history.

(56) References Cited

U.S. PATENT DOCUMENTS

| | | | |
|---|---|---|---|
| 5,745,693 A | 4/1998 | Knight et al. | |
| 6,496,831 B1 | 12/2002 | Baulier et al. | |
| 6,873,981 B2 | 3/2005 | Nareddy | |
| 7,251,584 B1 | 7/2007 | Parazolo et al. | |
| 7,761,439 B1 * | 7/2010 | Auerbach | 707/706 |
| 7,882,262 B2 * | 2/2011 | Bhattacharya et al. | 709/238 |
| 8,073,836 B2 * | 12/2011 | McNall et al. | 707/713 |
| 8,306,967 B2 | 11/2012 | Galitsky et al. | |

(Continued)

FOREIGN PATENT DOCUMENTS

| | | |
|---|---|---|
| CN | 1937537 A | 3/2007 |
| JP | 2001-109647 | 4/2001 |

(Continued)

OTHER PUBLICATIONS

International Search Report corresponding to International Application No. PCT/US2008/078442, dated Feb. 26, 2009, 3 pages.
Agrawal, et al., "Fast Algorithms for Mining Association Rules"., Proceedings of the 20th VLDB Conference, Santiago, Chile, 1994, 13 pages.
Li, et al., "Monitoring of Component-Based Systems". Imaging Systems Laboratory, HP Laboratories Palo Alto, HPL-2002-25 (R.1), May 28, 2003., 27 Pages.
Li, et al., "Monitoring and Characterization of Component-Based Systems with Global Causality Capture"., Proceeding ICDCS '03 Proceedings of the 23rd International Conference on Distributed Computing Systems., IEEE Computer Society Washington, DC, 2003, 11 Pages.

(Continued)

*Primary Examiner* — Monica Pyo
(74) *Attorney, Agent, or Firm* — Fish & Richardson P.C.

(57) ABSTRACT

To retrieve a sequence of associated events in log data, a request expression is parsed to retrieve types of dependencies between events which are searched, and the constraints (e.g., keywords) which characterize each event. Based on the parsing results, query components can be formed, expressing the constraints for individual events and interrelations (e.g., time spans) between events. A resultant span query comprising the query components can then be run against an index of events, which encodes a mutual location of associated events in storage.

18 Claims, 8 Drawing Sheets

Log Management System

(56) References Cited

U.S. PATENT DOCUMENTS

| | | | |
|---|---|---|---|
| 2002/0062237 A1 | 5/2002 | Matsumoto et al. | |
| 2002/0107841 A1 | 8/2002 | Hellerstein et al. | |
| 2002/0174083 A1 | 11/2002 | Hellerstein et al. | |
| 2004/0249808 A1 | 12/2004 | Azzam et al. | |
| 2005/0114508 A1* | 5/2005 | DeStefano | 709/224 |
| 2005/0114708 A1* | 5/2005 | DeStefano et al. | 713/201 |
| 2006/0004691 A1 | 1/2006 | Sifry | |
| 2006/0020580 A1* | 1/2006 | Dettinger et al. | 707/3 |
| 2006/0242135 A1 | 10/2006 | Weare | |
| 2007/0038889 A1 | 2/2007 | Wiggins et al. | |
| 2007/0094243 A1 | 4/2007 | Kwak et al. | |

FOREIGN PATENT DOCUMENTS

| | | |
|---|---|---|
| JP | 2003-141075 | 5/2003 |
| JP | 2006-259811 | 9/2006 |
| WO | 02/17183 | 2/2002 |
| WO | 0217183 | 2/2002 |

OTHER PUBLICATIONS

Office Action, Examination Report for China Patent Application No. 200880118867X, mailed Apr. 24, 2012, 2 pages.

Office Action for Chinese Patent Application No. 200880118867.X, Mailed Apr. 24, 2012, 7 Pages (English Translation of CN Office Action mailed Apr. 24, 2012, 7 Pages).

Lee et al., "Event and rule services for achieving a web-based knowledge network," *Knowledge Based Systems*, 2004, 17(5-6):179-188.

Office Action for Chinese Application No. 200880118867.X, mailed May 21, 2013, 15 pages (with English translation).

Office Action for European Application No. 08835544.1, mailed Apr. 16, 2013, 7 pages.

European Search Report (under R.61 or R.63 EPC) or Supplementary European Search Report (AR. 153(7) EPC) for EP application No. EP 08835544.1. Mailed Nov. 8, 2011. 5 pages.

* cited by examiner

SEARCHING FOR ASSOCIATED EVENTS IN LOG DATA

CROSS-REFERENCE TO RELATED APPLICATIONS

This application is a continuation of U.S. patent application Ser. No. 11/866,337, filed on Oct. 2, 2007, the entire contents of which are hereby incorporated by reference.

TECHNICAL FIELD

The subject matter of this application is generally related to computer log management.

BACKGROUND

Log management is a process of collecting, aggregating, analyzing, alerting on and archiving data from various computer network devices, such as servers, routers, switches, firewalls, etc. Log search is a process of identifying individual log messages associated with events. Log search, as a part of log management, can assist in achieving corporate compliance goals and reduces the risk of legal exposure from security breaches. Log search can also significantly reduce network downtime by helping information technology (IT) departments identify particular problems in a network, and fix those problems by identifying and analyzing log messages potentially associated with those problems.

An important aspect of log analysis is the ability to search for associated log messages (e.g., associated pairs or triples of log messages). Conventional search approaches use an index which allows retrieval of a sequence of search items. For example, web search and desktop search provide means to access individual entities, such as documents or database records. These searches, however, are of limited value in log management because groups of associated log messages cannot be retrieved.

SUMMARY

To retrieve a sequence of associated events in log data, a request expression is parsed to retrieve types of dependencies between events which are searched, and constraints (e.g., keywords) which characterize the events. Based on the parsing results, query components can be formed, expressing constraints for individual events and interrelations (e.g., time spans) between events. A resultant span query comprising query components can be run against an index of events, which encodes a mutual location of associated events in a searchable data structure (e.g., log file storage).

The disclosed implementations provide quicker access to log events, allow better means for retrieval of associated messages, and automate the analysis of log data by making the search process more interactive. Relationships between messages (events) can be specified as following in time, belonging to an entity such as a server, being performed by an agent such as a user, and a conjectured causal relationship between events.

Other event retrieval scenarios of multi-message search are disclosed. For example, a Which scenario includes a search of all occurrences of intermediate query subjects, followed by a search of final query subjects, which are related to the intermediate query subjects by an association of terms specified in a user query.

DETAILED DESCRIPTION

Log Management System Overview

Figure 1:
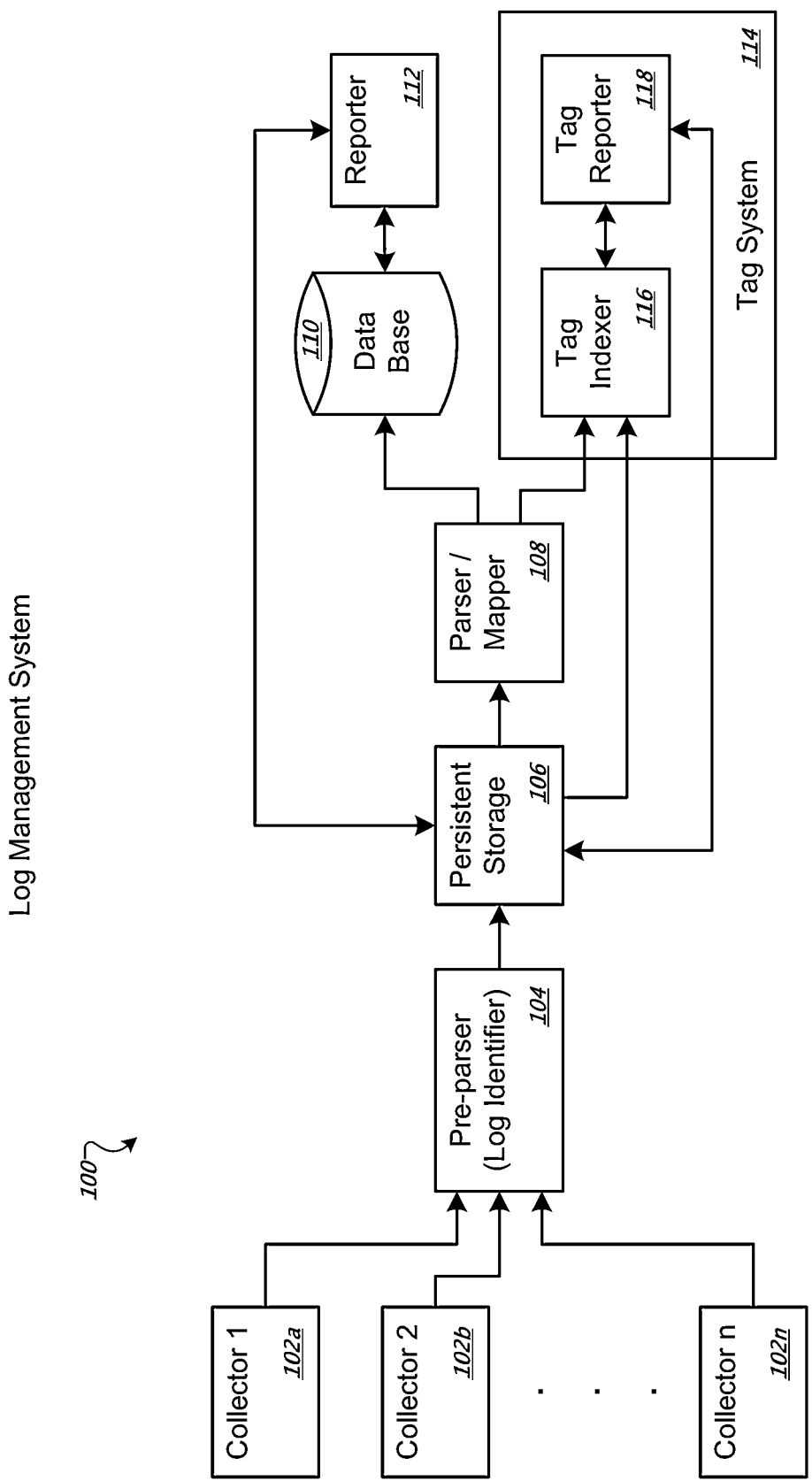
FIG. 1 is a block diagram of an example log management system.

FIG. 1 is a block diagram of an example log management system 100. In some implementations, the log management system 100 includes one or more collectors 102a through 102n, a pre-parser 104, persistent storage 106, a parser/mapper 108, a database 110, a reporter 112 and a tag system 114. The tag system 114 further includes a tag indexer 116 and a tag reporter 118. Such implementations allow one or more users to use the reporter 112 and the tag reporter 118 to generate new reports and customized reports on data collected by the collectors 102a through 102n. The event data (e.g., log messages) for such reports can be collected and processed by the remaining components of the log management system 100. Hereinafter, the term "tag" and "attribute" are used interchangeably. Tags/attributes are entities that define properties or characteristics of objects or elements. Tags/attributes usually, but not always, consist of a name and value.

In some implementations, the collectors 102a through 102n are operationally coupled with the pre-parser 104. In some implementations, the various components of the system 100 can be co-located on the same hardware platform, or located on multiple hardware platforms connected by one or more networks (e.g., Ethernet, Internet, intranet). Each of the collectors 102a through 102n can be any device that collects event data from one or more other computing devices or applications. Such information collection can be active or passive, and can include information such as error messages, user transactions, system events, application milestones, and data access attempts, etc. For example, the collector 102a can be a LogLogic LX 500 appliance (manufactured by loglogic, Inc. of San Jose, Calif.), which can be configured to passively collect and analyze information, such as, for example, messages, errors and transactions as they occur on one or more data servers. Other event information collected actively from the same servers may include availability status, current storage capacities, resource usage, etc. In another example, the collector 102b can be a LogLogic LX 2000 appliance, which can be configured to actively and passively collect and analyze information from e-mail systems, such as, for example, message/attachment statistics, failed login attempts, password changes, etc.

The information collected by collectors 102a through 102n is transmitted to the pre-parser 104. Such information can be transmitted via "flat files" produced by sequentially logging events as they occur, or as periodic messages representing snippets of the flat files. In some implementations, transmission of log data can follow one or more standard networking protocols, such as Transmission Control Protocol (TCP), for transmitting data as a stream of bytes. The collectors also append information to each log message which describe the context of the message (e.g. time the log message was received by the collector, the source device where the message originated).

The pre-parser 104 receives raw log information, together with the context header generated by the collectors, from the one or more collectors 102a through 102n. During the process, the pre-parser 104 determines the log source type and version, using pre-defined signatures for each log source (e.g. Cisco® Firewall version 7, Oracle® Database version 10). The pre-parser 104 stores this information with the unaltered log information in persistent storage 106 for subsequent use by the log management system 100.

The system 100 uses the persistent storage 106 to store log information received from the pre-parser 104. In some implementations, the storage method can employ one or more "flat files" containing individual logs messages. For example, a "row" in a flat file containing log messages from an email system may contain a user's name (e.g., "Matt"), IP address, location, and event occurrence, such as a failed login attempt. Such an entry may include a timestamp for identifying the time (e.g., down to the minute or fraction of a second) that the entry was made. In some implementations, the system 100 may be configured to retain certain logs in the persistent storage 106 for a user-specified period of time. For example, log files containing event data pertinent to Health Insurance Portability and Accountability Act (HIPAA) regulations may be retained for several years.

The parser/mapper 108 uses log information contained in the persistent storage 106 to generate tags, or indices, representing the data. The process includes the action of parsing lines of log information stored in the persistent storage 106 while searching for pertinent event data. Such parsing processes may employ pre-defined parsing rules and keyword indices. For example, parsing a log file from an email application may employ parsing rules that specify that the system 100 is to search for user-related event data containing "USER_ID" and the user's name in brackets. In addition to parsing, the parser/mapper 108 maps the information it locates to the corresponding log file and associated event data in the log file. In such a way, a specific log file's event data, such as that containing "USER_ID:[MATT]," can be mapped. In another example, parsing rules and keywords may exist such that a daily application milestone, for example "CERES END OF DAY," is extracted from a system log along with a timestamp. Such information can be used to compare (and report over time) regular event occurrences, such as the "END OF DAY" event for an application named "CERES."

In some implementations, the operations performed by the parser/mapper 108 can occur in near real-time as log file entries are available in the persistent storage 106. In other implementations, the parser/mapper 108 can be scheduled to execute at pre-determined intervals or thresholds, such as those based on elapsed time or log file size.

The system 100 can store indices for mapped log information in one or more databases. For example, the system 100 can use the database 110 to store an inverted index representing mapped log information in the persistent storage 106. In some implementations, entries in the database 110 can be created by the parser/mapper 108. A user employing the reporter 112 can access the database 110 to aid in executing standard text searches using regular expressions.

One possible implementation of the attribute/value generation is done through regular expression rules. First a set of regular expression rules, which constitute the preparser rules, detect the "signature" of different message types. Once the log message type is identified by its signature, a set of rules, which constitute the parser rules, specific to the message types are applied to extract the different attribute/value sets from each message. After the initial extraction of the attribute/value sets, there may be additional rules which add additional attributes to the message. These latter set of rules essentially segment the space of the initial attribute/value set (generated by the regular expression rules) into regions, and label each region with a new attribute/value. We refer to these latter set of rules as mapping or classification rules.

An example of the process described above is as follows. First, a signature of the message identifies it as a "typeA" log. Next, rules for a "typeA" log are applied. This step could generate, for example, the attributes: user=uuu, device=ddd, action=aaa and result=rrr. If a user is in set {a, b, c} and an action is in set {a1, a2, a3}, then criticality=ccc. The overall attribute/value set for the message which gets stored will be the union of steps 1, 2 and 3 above, i.e., the message is transformed in the following set of attribute/value pairs: (message type=typeA, user=uuu, device=ddd, action=aaa, result=rrr, criticality=ccc).

The process of generating a report using the reporter 112 can begin when a query originating on the reporter 112 is sent to the database 110. For example, the query's purpose may be to search for email event data associated with a user named "MATT." Upon receipt of the query, the database 110 transmits the corresponding indices to the reporter 112. Using these indices, the reporter 112 requests the corresponding event data from the persistent storage 106. The reporter 112 receives the corresponding event data, completing the process. In some implementations, the database 110 and the reporter 112 can be implemented using open source database or search technologies, for example MySQL® or Lucene®. Using such technologies can facilitate token-based searches such as "find me all the event data entries that contain the phrase 'failed login attempt'." Such searches can utilize Boolean functions, wildcard characters, and other special query tools. However, the predefined schemas and structured reports available by using the database 110 and the reporter 112 alone may limit the complexity and scope of queries performed on the system 100. In particular, users may want to search on raw log messages with more sophisticated queries, particularly queries that are based upon relationships between attributes of related event data in the log files. Such reporting capabilities can be provided by the tag system 114, as described below.

Tag System Overview

The tag system 114 includes the tag indexer 116 and the tag reporter 118. The tag indexer 116 receives tags, or indices, from the parser/mapper 108 based on the raw log data it processes in the persistent storage 106. The tag indexer 116 represents particular instances of information in the log files as unordered attribute/value pairs. In some implementations, the tag indexer 116 stores these attribute/value pairs as an inverted log index using a list of pointers to the raw log messages corresponding to the attribute/value. For example, an attribute/value pair may represent the name of a user (e.g., user=Matt) or the result of an action (e.g., action=failed login) on a particular server (e.g., server=email). The tag indexer 116 maintains a count of each attribute/value pair for each time period (e.g., user=Matt: 10, 12, 24 means that user=Matt occurs 10, 12, and 24 times in three consecutive hours). The tag indexer 116, may also maintain counts of attribute/value tuples, where a tuple is a set of attribute/value pairs that co-occur together. For example one such tuple may represent: user=Matt, action=failed login and server=email. In this case, this tuple represents the number of failed logins by user Matt on the email server for different time periods. In addition to the count representing the user's number of failed login attempts, the tag indexer 116 can maintain pointers (explained in more detail below) to the corresponding raw entries in the log files. Using the information contained in the tag indexer 116, the tag reporter 118 can be used to generate reports relating to attributes and values. Such reports can be more sophisticated than the standard token-based reports provided by the reporter 112 because the tag reporter 118 can utilize relationships among two or more related attribute/value pairs, as will be described in more detail below.

For example, while the reporter 112 may be used to generate a standard list of email system events, the tag reporter 118 may be used to plot the number of email messages over the last day, and group them by SPAM result. In another example, the tag reporter 118 may be used to generate a report of the highly confidential email messages, grouped by the top n senders.

In some implementations, a user interface (not shown) for the log management system 100 may contain separate tabs for the reporter 112 and the tag reporter 118. The user may further select functionality under each tab corresponding to the user's report requirements at the time. For example, controls under the tag reporter 118 tab may permit the user to view information such as attribute pairs (described below) that share relationships and can be used to generate reports that exploit such relationships. Other controls under the tag reporter 118 may facilitate the formulation and launching of reports using event data in the tag indexer 116.

Query Formation and Processing Overview

Figure 2:
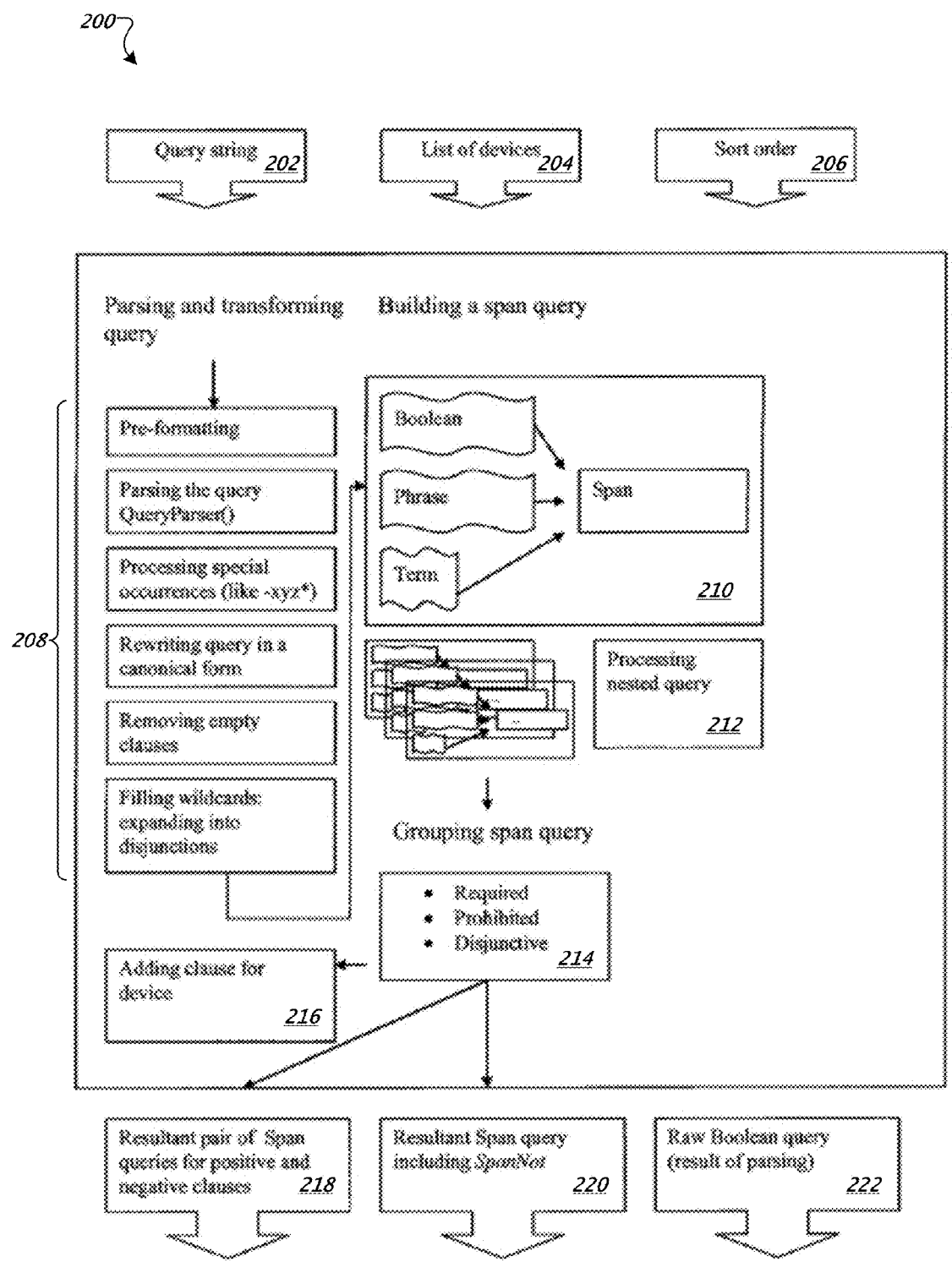
FIG. 2 is a schematic diagram of an example method for forming a query for associated events in log data.

FIG. 2 is a schematic diagram of an example method 200 for forming a query for associated events in log data. The method 200 accepts a query string 202 as an input. The query string 202 includes search terms, such as a sequence of keywords. The query string 202 may form a natural language query in English or another language. The query string 202 may produce search results as an ordered set of events (e.g., log messages) or collections of events that satisfy the search terms. Hereinafter, the term "event" and "message" are used interchangeably, as well as "terms" and "keywords" to describe content of messages.

In some implementations, events in the log data may be indexed. The index of events is a system for storing events which is optimized for their search, and could be, for example, an inverse index, which stores for every log message term all occurrences of the term in the log messages. To make retrieval efficient, log messages may be split into multiple index systems, such as after a particular time interval elapses (e.g., every hour) or after the index reaches a particular size. Occurrences of a log message in an index can be specified as a pair of integers, the first being an index document identifier (ID) and the second being a message ID within the index document. In one example, individual log messages in the indices may be made searchable by representing each log message as a sequence of terms (e.g., keywords) including start and end terms. An index query may include the terms from the input search query 202 embedded within the start and end terms.

Other inputs may include a list of devices 204 at which events may occur and a sort order 206 for the search results. Inputs may, for example, be provided by a user or retrieved from a storage device.

The method 200 parses and transforms 208 the query string 202. The parsing and transforming 208 may include a pre-formatting of the query string 202. For example, the query string 202 may be changed to lower case letters and separated into words. The query string 202 may be parsed to identify clauses, reserved words, attributes, and values. The parsing and transformation 208 may further include processing special occurrences, such as wild cards and word stems. The query string 202 may be rewritten in a canonical form. The query may be syntactically analyzed to identify and remove clauses that have no effect on the search results. Wildcards in the query may be expanded into disjunctions (e.g., logical "or" statements). For example, in the case of a word stem wildcard such as "play*" a disjunction may include "play or player or playing or played."

The method 200 builds 210 a span query. Boolean operators, phrases, and terms are combined to form the span query. The method 200 may process 212 nested queries. For example, the query may include multiple clauses where one or more clauses are subordinate to another clause. The method 200 groups 214 the span query. The span query may be grouped by required values, prohibited values, and disjunctive values. The method 200 may add 216 clauses to the query for devices.

The method 200 generates as its output queries 218, 220, and 222 based on the query string 202. The method 200 may output pairs of span queries 218 for positive and negative query clauses. The method 200 may output a span query 220 including a SpanNot (e.g., a query having one or more terms with attribute values for inclusion and one or more terms with attribute values for exclusion). The method 200 may output a raw Boolean query 222, such as a result of parsing the query string 202.

Figure 3:
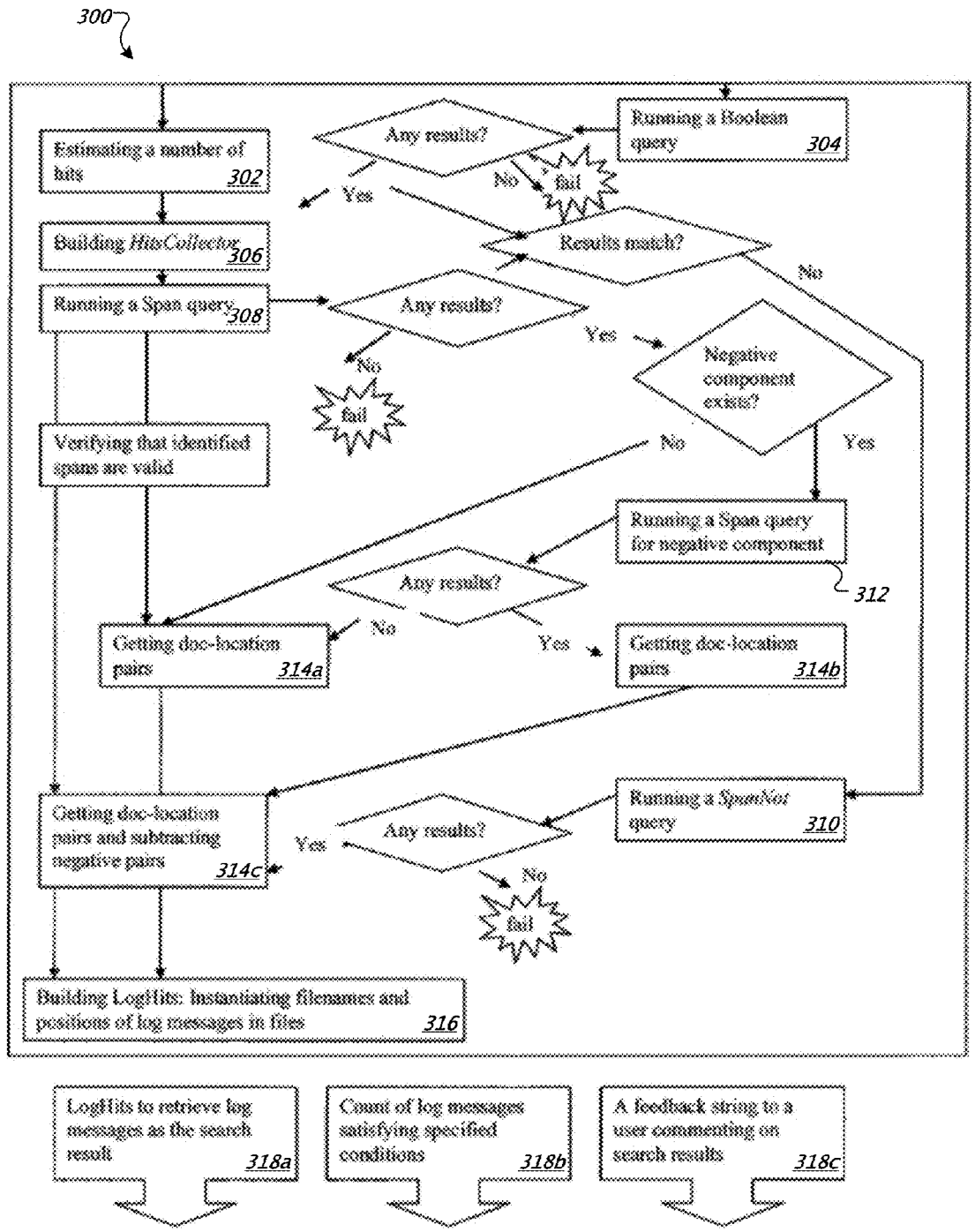
FIG. 3 is a schematic diagram of an example method for performing a query for associated events in log data.

FIG. 3 is a schematic diagram of an example method 300 for performing a query for associated events in log data. In some implementations, the method 300 begins with estimating 302 a number of search results and with performing 304 a Boolean query. The method 300 builds 306 a HitsCollector to receive the results of a span query. The method 300 performs 308 a span query. If there are results from the Boolean query and the span query, and there are results that match, then the method 300 performs 310 a SpanNot query. Otherwise if there are results from both the Boolean query and the span query, and there are no matching results, and a negative component exists, then the method 300 performs 312 a span query for the negative component. The method 300 retrieves 314a-c file name and file location pairs for results from the span query, the span query for the negative component, and the SpanNot query. If there are results from the span query for the negative component or the SpanNot query, then the method 300 subtracts 314c negative pairs of file names and file locations. The method 300 retrieves 316 the log messages associated with the remaining file name and file location pairs. The method 300 may output results 318a-c, such as the log messages, a count of the log messages, and user feedback regarding the condition of the search results.

Query Templates Overview

Figure 4:
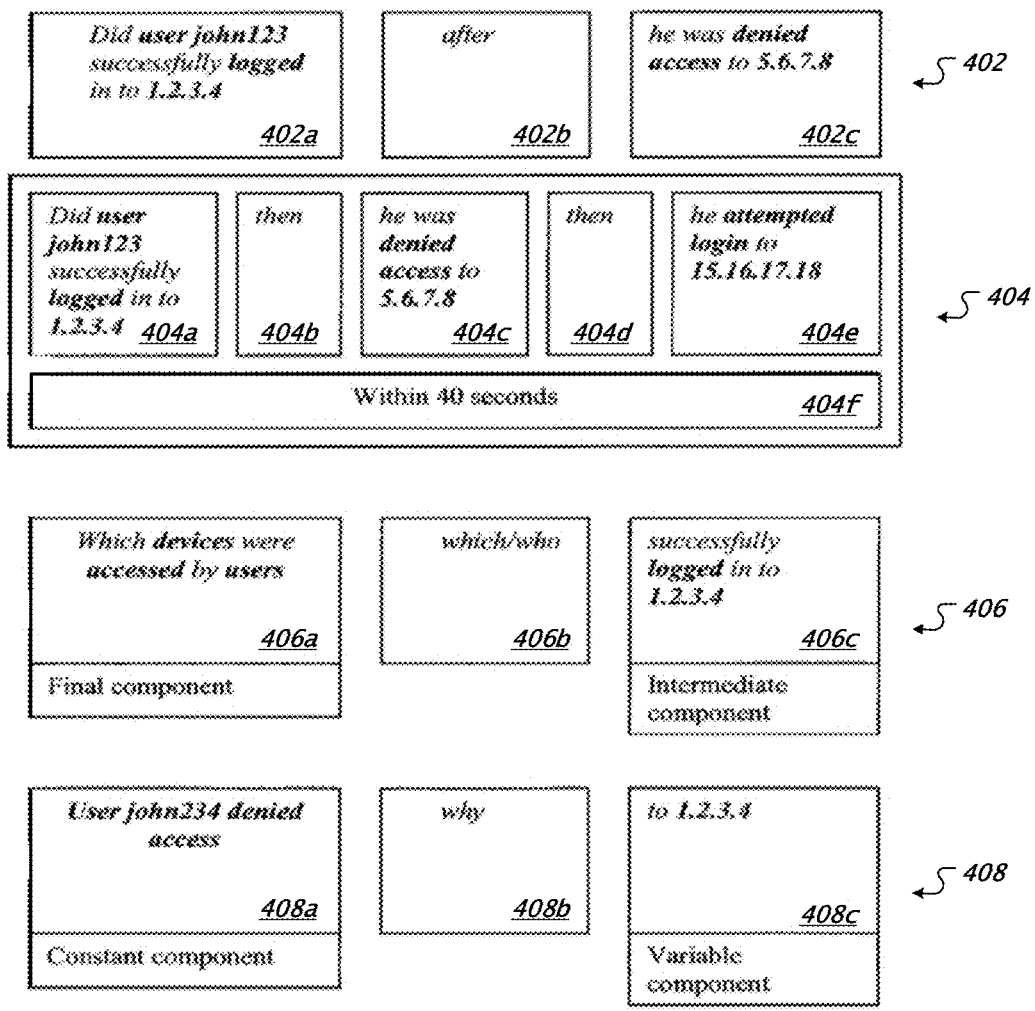
FIG. 4 is a block diagram of examples of components within sequence of events queries, a multiple restriction query, and a causation query.

FIG. 4 is a block diagram of examples of components within sequence of events queries 402 and 404, a multiple restriction query 406, and a causation query 408. The sequence of events queries 402 and 404 include the constraints for each event, such as "user john123" 402*a* and 404*a* and a temporal relations, such as "after" 402*b* and "then" 404*b* and 404*d*, followed by the constraints for the following event, such as "denied access" 402*c* and 404*c*. The query 402 for two events may be input by a user as, "Did user 'john123' successfully logged in to '1.2.3.4' after he was denied access to '5.6.7.8'." Keywords, such as "user john123," "logged," "1.2.3.4," "denied," "access," and "5.6.7.8" are identified. Stop words, such as articles, pronouns, and other specified common words are eliminated from the query. The template includes the components for constraint for each event and the component for temporal relation between them.

In some implementations more than two events in a sequence of events can be searched. For example, the query 404 input by a user as, "Did user 'john123' successfully logged in to '1.2.3.4' then he was denied access to '5.6.7.8' then he attempted login to '15.16.17.18' within 40 seconds" includes components for constraints for individual events 404*a* and 404*c*, interchanged with the components for temporal relationships 404*b* and 404*d*, and also an overall time span component 404*f*.

The system processes multiple restriction queries, such as query 406, using a two-step search. The query 406 includes an intermediate component 406*c*, where the search keywords are indicated explicitly (e.g., "logged" and "1.2.3.4"), and a final component 406*a*, which includes keywords specified initially (e.g., "devices," "accessed," and "users") and the terms obtained as a result of running the intermediate query 406*c*. There is also a separator component 406*b* which includes reserved words, such as the "which" or "who" keywords.

The system processes causation queries, such as query 408, using a multi-step search which identifies common keywords in log messages, which may be causes of the searched events. The query 408 includes a constant component 408*a*, which reduces the set of events under consideration. The query 408 includes a variable component 408*c*, which specifies the keywords whose correlation with preceding events will be searched for. The query 408 includes a separator component 408*b*, which includes reserved words, such as the "why" keyword.

Searching for a Sequence of Events Within a Time Span Overview

Figure 5:
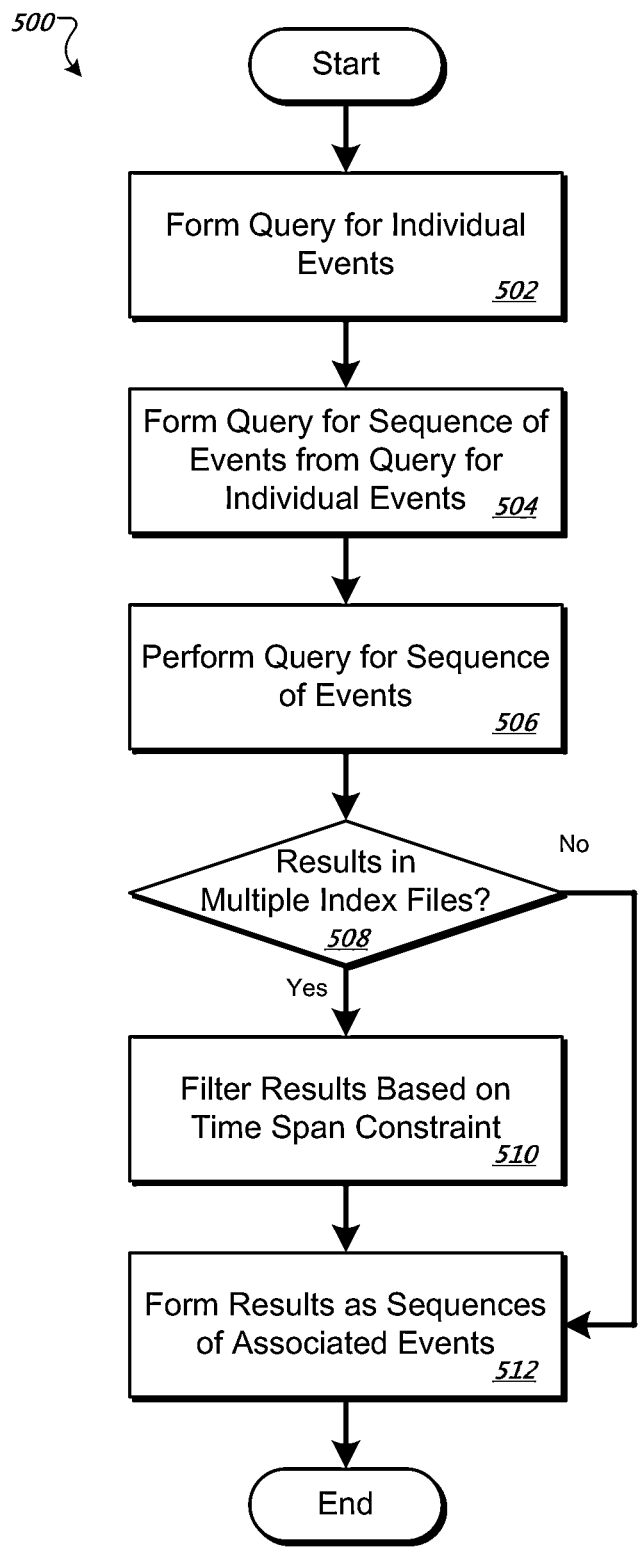
FIG. 5 is a flow diagram of an example process for searching for associated events in log data using a sequence of events query.

FIG. 5 is a flow diagram showing an example of a process 500 for searching for associated events in log data using a sequence of events query. The process 500 begins with forming 502 a query for individual events. For example, the system 100 may form the query components 402*a* and 402*c*, and the query components 404*a*, 404*c*, and 404*e*.

The process 500 forms 504 a query for a sequence of events based on the queries for individual events. The individual queries may implicitly include a time span between a first event (e.g., 402*c*) and a last event (e.g., 402*a*) in a sequence of events. Alternatively or in addition, the sequence of events query may include an explicit time span constraint, such as 404*f*.

The process 500 performs 506 the query for the sequence of events. If there are results in multiple index files (508), then the process 500 filters (510) results in the sequence of events to maintain the time span constraint. For example, the system 100 may calculate the time span between index files to maintain the overall time span constraint. The process 500 forms (512) the set of results as sequences of associated events within a time span.

Performing a Multiple Restriction Query Overview

Figure 6:
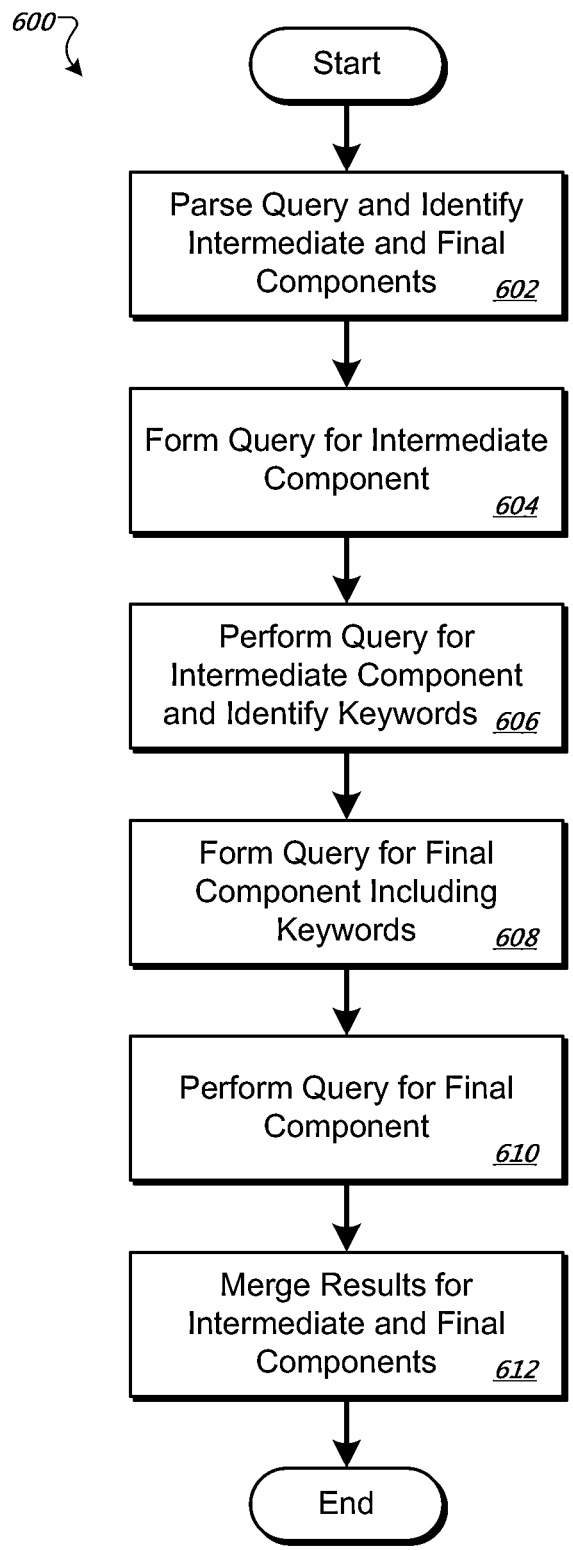
FIG. 6 is a flow diagram of an example process for searching for associated events in log data using a multiple restriction query.

FIG. 6 is a flow diagram showing an example of a process 600 for searching for associated events in log data using a multiple restriction query. The process 600 begins with parsing (602) a query to identify one or more intermediate components and a final component. For example, the system 100 may receive a query string including "Which devices were accessed by users who successfully logged in into '1.2.3.4'." The system 100 parses the query to locate a reserved word, such as "which" or "who." The system 100 identifies the clause preceding the reserved word 406*b* as the final component 406*a* and the clause after the reserved word 406*b* as the intermediate component 406*c*.

The process 600 forms (604) a query for the identified intermediate component. For example, the system 100 may form a query, such as "SELECT user from this table WHERE device='1.2.3.4'."

The process 600 performs (606) the query for the intermediate component to identify keywords to be included in a query for the final component. For example, the system 100 performs the query for the intermediate component to determine the users associated with the device "1.2.3.4."

The process 600 forms (608) the query for the final component using results of the query for the intermediate component. For example, the system 100 may form a query, such as "SELECT device from this table WHERE user=[results of intermediate query]."

The process 600 performs (610) the query for the final component. For example, the system 100 performs the "SELECT device from this table WHERE user=" query for each of the results determined from the intermediate query.

The process 600 merges (612) the results from the intermediate query and the final queries. For example, the system 100 may build a user interface view that presents an individual event from the intermediate query along with a set of events from the final query associated with the individual event. The values of "user" from the intermediate query form a SpanOr component for the final query.

Each query part may have additional constraints. For example, the system 100 may receive a query string, such as "Which devices 'dst:255.*;service:67;s_port:68;rule:0' were accessed by users who successfully logged in to '1.2.3.4' product 'product:VPN-1&Firewall-1'." The system 100 forms and performs the intermediate query "SELECT user from this table WHERE device='1.2.3.4' AND 'product: VPN-1&Firewall-1'." The system 100 forms and performs the final query "SELECT device from this table WHERE device='dst:255.*;service:67;s_port:68;rule:0' AND user= [results of intermediate query]."

Performing a Causation Query Overview

Figure 7:
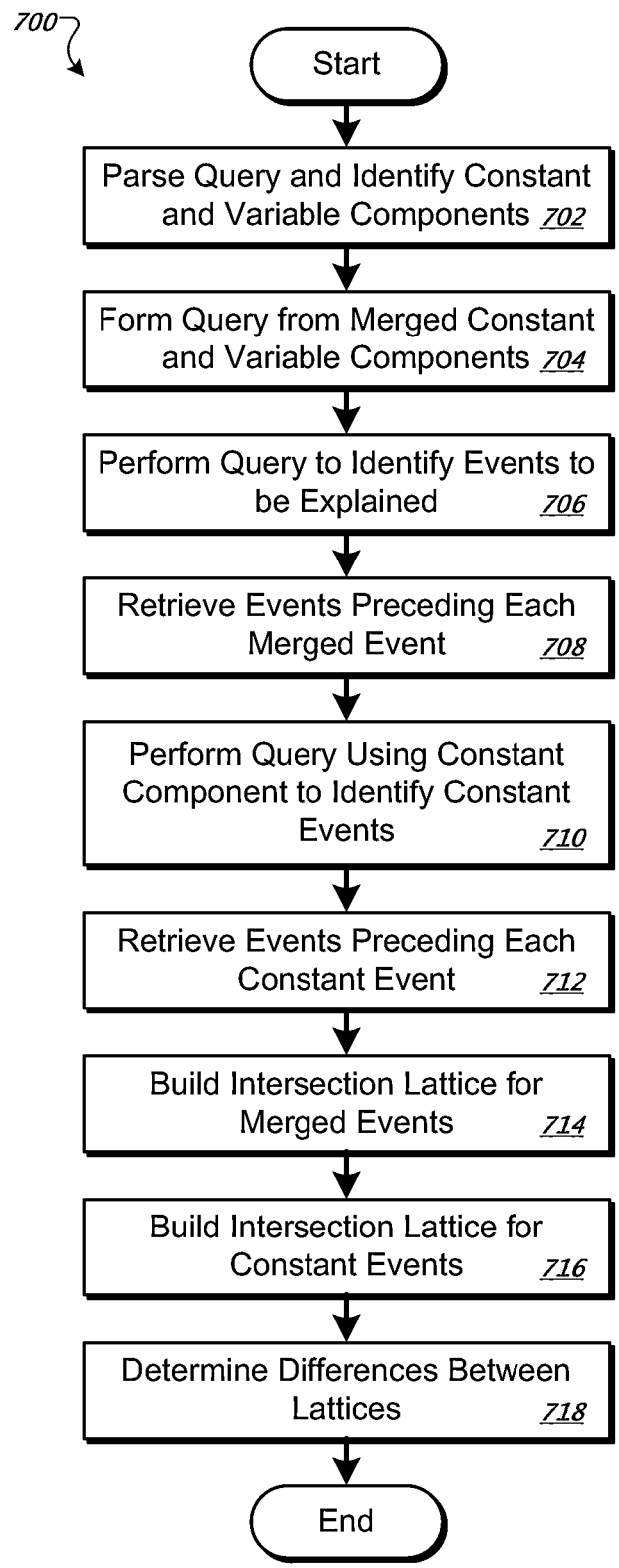
FIG. 7 is a flow diagram of an example process for searching for associated events in log data using a causation query.

FIG. 7 is a flow diagram showing an example of a process 700 for searching for associated events in log data using a causation query. The process 700 parses (702) a query to identify constant and variable components. For example, the system 100 may locate a reserved word, such as "why," to identify the constant component 408*a* preceding the reserved word and the variable component 408*c* following the reserved word. Alternatively, another reserved word, such as "when," may be used as well as another rule for locating the constant and variable components.

The process 700 forms (704) a query by merging the constant and variable components. For example, the system 100 may form a query such as "SELECT * from this table where user='john234' and device='1.2.3.4'."

The process 700 performs (706) the merged query to identify events to be explained. For at least one of the identified merged events, the process 700 retrieves (708) events preceding the identified merged event within a particular time span.

For example, the system 100 may perform a query for each of the results from the merged query, such as "SELECT * from this table WHERE time=[time results of merged query]–10 minutes." The time span may be received from the user or retrieved from a storage device.

The process 700 performs (710) a query based on the constant component. For example, the system 100 may perform a constant query, such as "SELECT * from this table where device='1.2.3.4'." For at least one of the identified constant events, the process 700 retrieves (712) events preceding the identified constant event within a particular time span.

The process 700 builds (714) a lattice for the identified merged events. The process 700 builds (716) a lattice for the identified constant events. A lattice is the set of event intersections between two or more sets of events. An order can be defined on the intersections. The process 700 performs (718) a set subtraction to determine differences between the merged event intersection lattice and the constant event intersection lattice. The process 700 outputs the list of differences to the user as possible answers to the causation question posed by the user.

For example, the query for users who accessed the device "1.2.3.4" may include user "john234" as well as seven other users (user 1, user 2, user 3, user 4, user 5, user 6, and user 7). The users 1, 2, 3, and 4 have sequences of events that ended in granting access to the device "1.2.3.4" and the users 5, 6, 7, and "john234" have sequences of events that ended in denying access. The events include an interrupt event, an exchange event, a connect event, a reset event, and a start event represented hereafter as "i," "e," "c," "r," and "s," respectively. The events for each of the users are shown in the following table:

|        | Events |   |   |   | Result |
|--------|--------|---|---|---|--------|
| User 1 | i | e | c |   |   | Granted |
| User 2 | i | e | c |   | s | Granted |
| User 3 | i |   |   | r |   | Granted |
| User 4 | i | e |   |   | s | Granted |
| User 5 | i | e | c | r |   | Denied |
| User 6 | i |   | c | r |   | Denied |
| User 7 |   |   | c | r |   | Denied |
| john234 |  |   | c | r | s | Denied |

The intersections of sets of events for users that were granted access to the device "1.2.3.4" includes "i e c," "i," "i e," and "i e s." The intersections of sets of events for users that were denied access to the device "1.2.3.4" includes "i c r" and "cr." In this example, there are no sets of events in common between the intersections for granted access and the intersections for denied access. Where one or more sets of events are in common between the results of the intersections, the common sets of events are removed. The remaining sets of events from the intersections for denied access are then compared to the events for the user "john234" to determine the events "c r" as a possible cause of the user "john234" being denied access to the device "1.2.3.4."

In some implementations, the example above may be used to predict a result of a set of events. For example, to determine if the user "john234" is denied access to the device "1.2.3.4" based on the set of events "c r s," the set of events "c r s" may be compared to the remaining sets of events from intersections for granted access and intersections for denied access. If the set of events "c r s" includes a set of events from the intersections for granted access, then granted access is a possible result of the set of events "c r s." Otherwise, if the set of events "c r s" includes a set of events from the intersections for denied access, then denied access is a possible result of the set of events "c r s."

Figure 8:
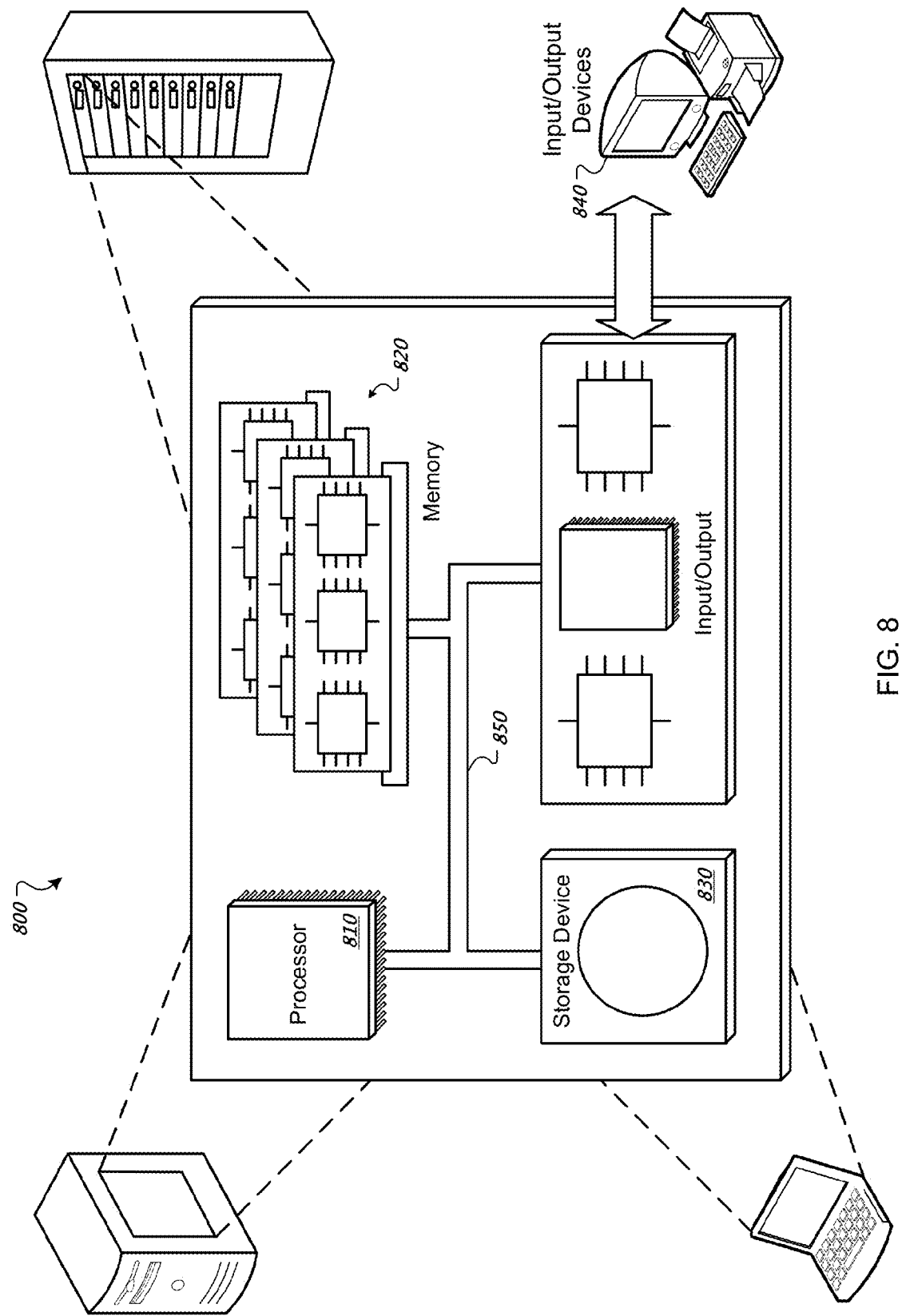
FIG. 8 is a schematic diagram of an example computing system that can be used in connection with processes described in reference to FIGS. 1-7.

FIG. 8 is a schematic diagram showing an example of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Nevertheless, it will be understood that various modifications may be made without departing from the spirit and scope of the following claims. Accordingly, other implementations are within the scope of the following claims.

What is claimed is:

1. A computer-implemented method, comprising:
   receiving, by a processor, a query searching for associated events in log data, the associated events being multiple events that are related to one another by a common component;
   parsing the received query, including:
      locating a reserved term from the received query;
      identifying an intermediate component of the received query, the intermediate component including a portion of the received query that is located after the reserved term; and
      identifying a final component of the received query, the final component including a portion of the received query preceding the reserved term, wherein the reserved term comprises a term indicating that the intermediate component constrains a variable in the final component;
   forming an intermediate query for the intermediate component, including constructing a first search term for the intermediate component, the first search term explicitly indicating one or more first keywords that appeared in the intermediate component of the received query;
   performing the intermediate query, including determining, using the intermediate query, one or more second keywords, each second keyword satisfying the search term in the intermediate query;
   forming a final query for the final component, including constructing a second search term for the final component, the second search term explicitly indicates the one or more second keywords resulted from performing the intermediate query;
   merging a result of performing the intermediate query and a result of performing the final query; and
   designating the merged results as the associated events in response to the received query,
   wherein the method is performed by one or more computers.

2. The computer-implemented method of claim 1, wherein:
   the common component includes at least one of a device or a user, and
   the reserved term includes a reserved word for identifying the device or a reserved word for identifying the user.

3. The computer-implemented method of claim 2, wherein the reserved word for identifying the device is "which" and the reserved word for identifying the user is "who".

4. The computer-implemented method of claim 1, wherein the result of the intermediate query is designated as a selection constraint in the final query.

5. The computer-implemented method of claim 1, wherein designating the merged results as the associated events comprises:
   providing for display a user interface view that presents an individual event from the intermediate query along with a set of events from the final query associated with the individual event.

6. The computer-implemented method of claim 1, wherein each of the received query, the intermediate query, and the final query is written in a structured query language.

7. A system comprising:
   a storage device operable for storing one or more events as log messages; and
   a processor coupled to the storage device and configured to perform operations comprising:
      receiving a query searching for associated events in log data, the associated events being multiple events that are related to one another by a common component;
      parsing the received query, including:
         locating a reserved term from the received query;
         identifying an intermediate component of the received query, the intermediate component including a portion of the received query that is located after the reserved term; and
         identifying a final component of the received query, the final component including a portion of the received query preceding the reserved term, wherein the reserved term comprises a term indicating that the intermediate component constrains a variable in the final component;
      forming an intermediate query for the intermediate component, including constructing a first search term for the intermediate component, the first search term explicitly indicating one or more first keywords that appeared in the intermediate component of the received query;

performing the intermediate query, including determining, using the intermediate query, one or more second keywords, each second keyword satisfying the first search term in the intermediate query;

forming a final query for the final component, including constructing a second search term for the final component, the second search term explicitly indicates the one or more second keywords resulted from performing the intermediate query;

merging a result of performing the intermediate query and a result of performing the final query; and designating the merged results as the associated events in response to the received query.

8. The system of claim 7, wherein:

the common component includes at least one of a device or a user, and the reserved term includes a reserved word for identifying the device or a reserved word for identifying the user.

9. The system of claim 8, wherein the reserved word for identifying the device is "which" and the reserved word for identifying the user is "who".

10. The system of claim 7, wherein the result of the intermediate query is designated as a selection constraint in the final query.

11. The system of claim 7, wherein designating the merged results as the associated events comprises:

providing for display a user interface view that presents an individual event from the intermediate query along with a set of events from the final query associated with the individual event.

12. The system of claim 7, wherein each of the received query, the intermediate query, and the final query is written in a structured query language.

13. A non-transitory storage device storing instructions operable to cause one or more computers to perform operations comprising:

receiving a query searching for associated events in log data, the associated events being multiple events that are related to one another by a common component;

parsing the received query, including:

locating a reserved term from the received query;

identifying a portion of the received query that is located after the reserved term;

identifying a final component of the received query, the final component including a portion of the received query preceding the reserved term, wherein the reserved term comprises a term indicating that the intermediate component constrains a variable in the final component;

forming an intermediate query for the intermediate component, including constructing a first search term for the intermediate component, the first search term explicitly indicating one or more first keywords that appeared in the intermediate component of the received query;

performing the intermediate query, including determining, using the intermediate query, one or more second keywords, each second keyword satisfying the first search term in the intermediate query;

forming a final query for the final component, including constructing a second search term for the final component, the second search term explicitly indicates the one or more second keywords resulted from performing the intermediate query;

merging a result of performing the intermediate query and a result of performing the final query; and designating the merged results as the associated events in response to the received query.

14. The non-transitory storage device of claim 13, wherein:

the common component includes at least one of a device or a user, and the reserved term includes a reserved word for identifying the device or a reserved word for identifying the user.

15. The non-transitory storage device of claim 14, wherein the reserved word for identifying the device is "which" and the reserved word for identifying the user is "who".

16. The non-transitory storage device of claim 13, wherein the result of the intermediate query is designated as a selection constraint in the final query.

17. The non-transitory storage device of claim 13, wherein designating the merged results as the associated events comprises:

providing for display a user interface view that presents an individual event from the intermediate query along with a set of events from the final query associated with the individual event.

18. The non-transitory storage device of claim 13, wherein each of the received query, the intermediate query, and the final query is written in a structured query language.

* * * * *